United States Patent
Fenn et al.

(10) Patent No.: US 7,368,499 B2
(45) Date of Patent: May 6, 2008

(54) AQUEOUS ACRYLIC COATING COMPOSITION

(75) Inventors: David Robert Fenn, Allison Park, PA (US); Andrew Robert French, Maidenhead (GB); Joan Cromie, Belfest (IE)

(73) Assignee: PPG Industries Ohio, Inc., Cleveland, OH (US)

( * ) Notice: Subject to any disclaimer, the term of this patent is extended or adjusted under 35 U.S.C. 154(b) by 412 days.

(21) Appl. No.: 10/945,040

(22) Filed: Sep. 20, 2004

(65) Prior Publication Data

US 2005/0038175 A1   Feb. 17, 2005

Related U.S. Application Data

(63) Continuation of application No. 10/203,193, filed on Aug. 5, 2002, now abandoned.

(51) Int. Cl.
 *C08F 220/06* (2006.01)

(52) U.S. Cl. .................. 524/522; 524/543; 524/556; 524/575

(58) Field of Classification Search ............... 524/522, 524/543, 556, 575
See application file for complete search history.

(56) References Cited

U.S. PATENT DOCUMENTS

| | | | |
|---|---|---|---|
| 4,518,724 A | 5/1985 | Kuwajima et al. | 523/501 |
| 5,219,900 A * | 6/1993 | Davies et al. | 523/201 |
| 5,869,569 A | 2/1999 | Arai et al. | 524/823 |
| 6,586,521 B2 * | 7/2003 | Blum et al. | 524/522 |

FOREIGN PATENT DOCUMENTS

| | | | |
|---|---|---|---|
| JP | 57164145 A | * | 10/1982 |
| ZA | 9809046 | | 5/1999 |

* cited by examiner

Primary Examiner—Randy Gulakowski
Assistant Examiner—Satya Sastri
(74) Attorney, Agent, or Firm—Diane R. Meyers

(57) ABSTRACT

An aqueous coating composition comprising a dispersion in an aqueous medium of (i) an acrylic addition polymer, (ii) an acrylic addition polymer having an acid value lower than that of polymer (i), and (iii) a base. The composition may also comprise a cross-linker, such as a polyisocyanate or a melamine resin. Also disclosed are methods for making such aqueous coating compositions and aqueous coating compositions made by such methods.

49 Claims, 1 Drawing Sheet

AQUEOUS ACRYLIC COATING COMPOSITION

CROSS-REFERENCE TO RELATED APPLICATION

This application is a continuation of U.S. patent application Ser. No. 10/203,193, filed on Aug. 5, 2002 now abandoned.

Figure 1:
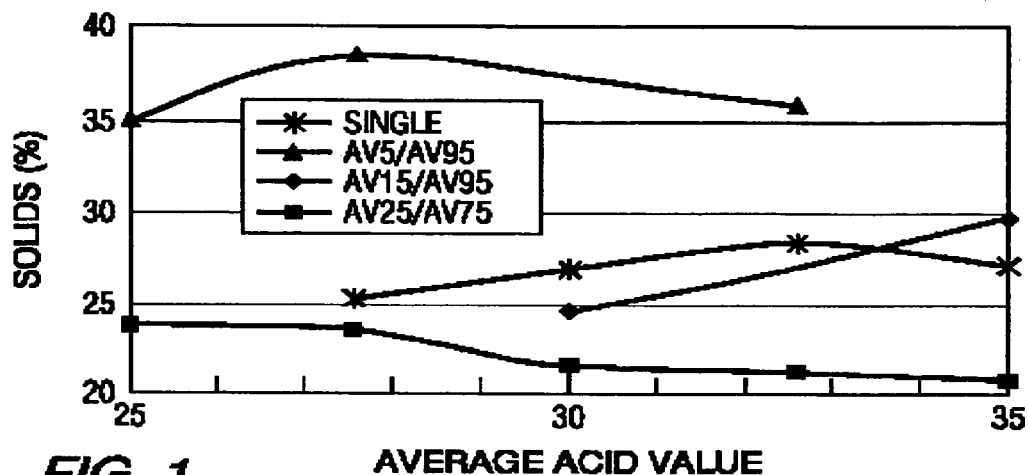
FIG. 1 is a graph comparing average acid value to percent solids content for the compositions prepared in Examples I to XIV.

This invention relates to an aqueous coating composition containing acrylic addition polymers. It also relates to a process for producing the coating composition, to a process of coating using the composition and to a coated substrate obtainable by the coating process.

One major known class of coating compositions comprises acrylic addition polymers as film formers. These can be carried in an organic solvent or an aqueous medium. The polymer can have various functional groups such as hydroxyl groups. These compositions can also contain a crosslinker which reacts with functional groups on the polymer so as to crosslink the final coating film. The crosslinker can be for example a polyisocyanate or a melamine formaldehyde resin. The compositions are applied as a layer to the surface of a substrate and either left to dry and cure at room temperature or else heated to initiate or speed the drying and curing process. During drying and curing the solvent or water evaporates and the polymer and cross-linker react together so as to produce a crosslinked coating film.

Due to environmental considerations there is a general trend in the coatings industry towards coating compositions with reduced organic solvent content. Coatings with a lower organic solvent content emit lower levels of solvent when they are used and so are less polluting of the atmosphere.

One way to achieve a lower solvent content is to use waterborne compositions. One method of incorporating acrylic addition polymers into water is to make them carboxyl (—COOH) functional by the incorporation of some carboxyl functional ethylenically unsaturated monomer such as acrylic acid during their manufacture, and neutralising at least some of the carboxyl groups in the aqueous composition by adding a base such as alkali metal hydroxide, ammonia or an amine. The resulting neutralised carboxyl groups stabilise the polymer in dispersion in water.

A problem, which we have discovered, is that in practice dilution with water to achieve suitable viscosities for application results in a solids content that is too low to achieve adequate film build per coat. For spray applications a solids content of 35-60% is preferred.

We have found that using a combination of acrylic polymers of different acid values and different hydrophobic monomer contents result in a water borne composition which can have a viscosity suitable for application whilst at the same time having a sufficiently high solids content to produce good film build per coat. In this specification AV is often used as an abbreviation for acid value. Acid value is the mass of potassium hydroxide in milligrams required to neutralize the acid groups in 1 gram of said resin.

According to the present invention in one aspect there is provided an aqueous thermosetting coating composition comprising a dispersion in an aqueous medium of
(i) an acrylic addition polymer having an acid value of at least 20, and
(ii) an acrylic addition polymer having an acid value lower than that of polymer (i) and
(iii) a base,
wherein polymer (i) and/or polymer (ii) contain additional functional groups, and
wherein polymer (i) has a lower hydrophobic monomer content than polymer (ii) and the overall styrene and substituted styrene content of polymers (i) and (ii) is 30% or less.

Preferably the overall styrene and substituted styrene content of polymers (I) and (ii) is 23.75% or less, more preferably 22.5% or less, yet more preferably 21.25% or less.

According to a second aspect of the invention there is provided an aqueous thermosetting coating composition comprising a dispersion in an aqueous medium of
(i) an acrylic addition polymer having a acid value of at least 20,
(ii) an acrylic addition polymer having an acid value lower than that of polymer (i) and
(iii) a base,
wherein polymer (i) and/or polymer (ii) contain additional functional groups, and
wherein (i) has a lower hydrophobia monomer content than polymer (ii), and polymer (i) has a hydrophobic monomer content of 10% by weight or less.

In either aspect of the invention, preferably the AV of polymer (i) is from 35 to 150, more preferably from 50 to 120, even more preferably from 75 to 100, and ideally 95.

Preferably the AV of polymer (ii) is less than 20, more preferably less than 10, and even more preferably 5 or less.

Preferably polymer (i) and polymer (ii) are present at a ratio of 1:99 to 99:1 by weight, more preferably 1:99 to 1:1, even more preferably 1:19 to 3:7.

The acrylic addition polymers are derived from polymerisable ethylenically unsaturated monomers such as vinyl or acrylic monomers. The polymers comprise structural units. At least one of the polymers also comprises carboxyl functional units. At least one of the polymers also comprises other functional units. Preferably both of the polymers also comprise other functional units.

Preferred acrylic addition polymers have a number average molecular weight as measured by gel permeation chromatography of 700 to 10,000, more preferably 1,000 to 6,000, most preferably 1,500 to 5,000.

Preferred acrylic addition polymers have a theoretical glass transition temperature (Fox Tg) of −30 to 100° C., more preferably 0 to 80° C.

When used herein, the term acrylic monomer refers to acrylic or methacrylic acid or their esters. The term (meth)acrylate refers to both the acrylate and methacrylate equally and the term (meth)acrylic acid refers to acrylic or methacrylic acid equally.

Structural units are derived from monomers which are non-functional, that is they do not have reactive functional groups. Examples of non-functional monomers are alkyl esters of (meth)acrylic acid and non-functional vinyl monomers.

Examples of suitable alkyl esters of (meth)acrylic acid are C1-12 alkyl esters such as methyl (meth)acrylate, ethyl (meth)acrylate, n-butyl (meth)acrylate, t-butyl (meth)acrylate, and n-propyl (meth)acrylate. Examples of non-functional vinyl monomers are styrene and alpha-methyl styrene.

Structural units can also be derived from non-functional chain transfer agents. Chain transfer agents are compounds which are used in the manufacture of acrylic addition polymers to control their molecular weight. Examples of known chain transfer agents include mercapto compounds. Examples of mercapto compounds that can be used to produce structural units include octyl mercaptan, dodecyl mercaptan and pentaerythritol tetra(3-mercaptopropionate).

Preferably polymer (ii) has a hydrophobic monomer content of at least 10% by weight, more preferably at least 20% by weight.

Polymer (i) has lower hydrophobic monomer content than polymer (ii). Preferably polymer (i) has a hydrophobic monomer content of 10% or less. More preferably polymer (i) has a hydrophobic monomer content of 5% or less.

Hydrophobic monomers are styrene, substituted styrenes (e.g. alpha-methyl styrene, vinyl toluene, t-butylstyrene) and alkyl esters of (meth) acrylic acid where the alkyl group contains six or more carbon atoms. Preferred hydrophobic monomers are styrene, alpha-methyl styrene, isobornyl methacrylate, ethylhexyl acrylate, ethylhexyl methacrylate and lauryl methacrylate. In the first aspect of the invention, the combined weight of styrene and substituted styrene in polymers (I) and (ii) is 30% or less of the total weight of polymers (I) and (ii). This is particularly important if the coating is a topcoatdesigned for exterior use. Topcoats having high levels of styrene tend to have poor resistance to ultaviolet radiation leading to gloss loss, cracking and colour change.

The carboxyl functional units can be derived from unsaturated carboxylic acid functional monomers, carboxylic acid functional chain transfer agents or carboxylic acid functional initiators. Examples of carboxylic acid functional monomers are acrylic acid and methacrylic acid. Examples of carboxylic acid functional chain transfer agents are mercaptoacetic acid, 3-mercaptopropionic acid and 2-mercaptopropionic acid. An example of an acid functional initiator is 4,4'-azobis (4-cyanopentanoic acid). It is also possible to produce carboxyl functional units by modifying other functional units on the polymer. For example hydroxyl functional groups can be reacted with cyclic anhydrides such as phthalic anhydride or hexahydrophthalic anhydride. Preferably the carboxyl functional units are derived from (meth) acrylic acid and/or 3-mercaptopropionic acid.

Other functional units are derived from monomers which carry reactive groups other than carboxyl groups, such as hydroxyl groups, acetoacetate groups, alkoxysilane groups and epoxy groups. An example of a monomer carrying an acetoacetate group is acetoacetyl methacrylate. An example of a monomer carrying an epoxy group is glycidyl (meth) acrylate. An example of a monomer carrying an alkoxysilane group is 3-(trimethoxysilyl)propyl methacrylate.

The compositions preferably comprise a crosslinker for the addition polymer. The crosslinker is a compound having on average at least two functional groups per molecule that will react with functional groups on the polymer. Examples of suitable crosslinkers are melamine formaldehyde resins, polyamines, polyamides, ketimines, aldimines and polyisocyanates.

When at least one of the polymers has acetoacetate functional groups suitable crosslinkers include polyamines. Polyamines are compounds containing at least two primary and/or secondary amine groups per molecule. Examples of polyamines are the EPI-CURE (™) range of polyamines available from Shell Chemicals. The amine groups can be blocked, for example by reacting primary amine groups with aldehydes or ketones. Examples of blocked polyamines are DESMOPHEN (™) LS 2965 and DESMOPHEN (™) LS 2142 available from Bayer.

When at least one of the polymers has alkoxysilane functional groups crosslinking can occur without the need for a separate cross linker. However alkoxy silane functional crosslinkers can be added, for example to increase the crosslink density of the coating. Examples of silane functional crosslinkers include the reaction products of polyisocyanates and aminosilanes as disclosed in EP 571 073 and the reaction products of polyacrylates and aminosilanes as disclosed in U.S. Pat. No. 4,429,082.

When at least one of the addition polymers has epoxy groups suitable crosslinkers include polyamines and polyamides. Polyamides are obtained by reacting dimerised fatty acids with polyamines. Examples of polyamides include the EPI-CURE™ range of polyamides available from Shell Chemicals.

Preferably at least one of the polymers contains hydroxyl functional units. More preferably both of the polymers contains hydroxyl functional units. If only one of the polymers contains hydroxyl functional groups, preferably it is the polymer with the lower AV ie. polymer (ii).

The optional hydroxyl functional units can be derived from hydroxyl functional vinyl or acrylic monomers or from hydroxyl functional chain transfer agents. An example of a hydroxyl functional vinyl monomer is vinyl alcohol. Examples of hydroxyl functional acrylic monomers are hydroxyethyl (meth)acrylate, and hydroxypropyl (meth) acrylate and hydroxybutyl (meth)acrylate. An example of a hydroxyl functional chain transfer agent is mercaptoethanol.

Other examples of suitable hydroxyl functional acrylic monomers are the reaction products of glycidyl (meth) acrylate with mono-carboxylic acids, such as versatic acid and the reaction product of (meth)acrylic acid with monoepoxy compounds such as CARDURA (™) E (the glycidyl ester of versatic acid; trade mark of Shell).

Preferably, at least one of the polymers comprises 10 to 50% by weight of hydroxyl functional units, more preferably 10 to 40% by weight. More preferably, both of the polymers comprises 10 to 50% by weight of hydroxyl functional units, more preferably 10 to 40% by weight.

Preferably at least one of the polymers has a hydroxyl value of 5 to 500 mgKOH/g of polymer, more preferably 50 to 250. More preferably both of the polymers have a hydroxyl value of 5 to 500 mgKOH/g of polymer, more preferably 50 to 250.

Preferably at least one of the addition polymers contains hydroxyl functional units and the compositions comprise a crosslinker. More preferably both of the addition polymers contain hydroxyl functional units and the compositions comprise a crosslinker. Suitable crosslinkers include melamine formaldehyde resins and polyisocyanates. Polyisocyanates are preferred.

Melamine formaldehyde resins are the reaction products of melamine and formaldehyde. Examples include partially methylated melamines and hexamethoxy methyl melamine.

Polyisocyanates are well known in the coatings art. Polyisocyanates are compounds having two or more isocyanate groups per molecule. Suitable polyisocyanates are aliphatic or aromatic polyisocyanates. Examples of suitable aliphatic diisocyanates are hexamethylene diisocyanate, isophorone diisocyanate and 1,3-bis(isocyanato-1-methylethyl)benzene (TMXDI). Examples of suitable aromatic diisocyanates are toluene diisocyanate and 4,4'-diphenylmethane diisocyanate.

Other suitable polyisocyanates include the isocyanurate trimers, allophanates and uretdiones of diisocyanates such as those described above as well as the reaction products of these diisocyanates with polyols. Polyols are compounds having three or more hydroxyl groups. Suitable polyols include trimethylol propane, glycerol and pentaerythritol. Many such polyisocyanates are commercially available, for example under the DESMODUR trademark from Bayer, the TOLONATE trademark from Rhodia and the CYTHANE trademark from Cytec Industries.

The polyisocyanates can optionally be blocked by reacting them with a blocking compound. A blocking compound is one which reacts reversibly with isocyanate groups to form an adduct which is stable at ordinary temperatures but which breaks down so as to regenerate the isocyanate groups at elevated temperatures, such as those used to cure the coating composition.

In order to make them dispersible in water, the polyisocyanates may also comprise a dispersion stabiliser, such as the product of the reaction between a polyisocyanate and a polyethylene glycol. Suitable stabilisers and mixtures of these stabilisers and polyisocyanates are known from European Patent EP-B-0 206 059 and European Patent EP-B-0 516 277.

Polyisocyanate crosslinkers are preferably used in an amount such that the ratio of isocyanate groups on the polyisocyanate to the number of hydroxyl groups on the polymer is in the range 0.8 to 2.

The compositions also comprise a base that at least partially neutralises the carboxyl groups on the addition polymers. Ammonia or an amine or mixtures thereof are the preferred bases, while alkali metal hydroxide bases are useful but less preferred. Examples of suitable amines are dimethylethanol amine, 2-amino-2-methyl-1-propanol and triethylamine. Preferably, the amount of base present is such as to be capable of neutralising between 30% and 100% of the carboxyl groups on the addition polymers.

The aqueous medium comprises predominantly water, optionally also containing organic solvent. Preferably the aqueous medium comprises at least 50% by weight of water and most preferably at least 70%. Suitable water miscible organic solvents include alcohols such as butanol, etheralcohols such as propylene glycol monomethyl ether and ester alcohols such as propylene glycol methyl ether acetate.

The compositions can also contain catalysts for the crosslinking reaction. Suitable catalysts include tin catalysts such as dibutyl tin dilaurate and amine catalysts such as triethylamine.

The compositions can also contain other conventional paint additives such as reactive diluents, pigments, fillers, UV absorbers and flow aids.

The compositions can also comprise additional polymeric components such as film forming polymers. Examples are polyester polymers or polyurethane polymers. Preferably the polymeric components of the composition, excluding any crosslinkers, are made up of at least 40% by weight of acrylic addition polymers, more preferably at least 50% and most preferably at least 75%.

The acrylic addition polymers can be produced by conventional means. In general they can be produced by contacting a mixture of the appropriate monomers including any chain transfer agent with a polymerisation initiator at a temperature at which polymerisation occurs. The process for preparing the addition polymers can be carried out in organic solution or, alternatively it can be carried out in the aqueous medium by aqueous emulsion polymerisation. Preferably it is carried out in organic solution.

For example, the initiator can be fed into the solvent at the polymerisation temperature simultaneously with the monomer mixture.

When the polymer is made by emulsion polymerisation, the monomer mixture can be fed together with the initiator and a surfactant into the stirred aqueous medium held at the polymerisation temperature. Sufficient base to at least partially neutralise the carboxyl groups on the polymer can be added before, during or after polymerisation but is typically added afterwards.

Typical polymerisation temperatures are 50 to 140° C. when the process is carried out in solvent and 50 to 95° C. when it is carried out by emulsion polymerisation in water.

Initiators can include for example typical free radical and redox types such as hydrogen peroxide, t-butyl hydroperoxide, di-t-butyl peroxide, butylperoxy-2-ethyl hexanoate benzoyl peroxide, 2,4-dichlorbenzoyl peroxide, t-butylperacetate, 2,2' azobis (2-methylbutyronitrile), ammonium persulphate, sodium persulphate, potassium persulphate, sodium and potassium perphosphates, and redox initiators such as persulphate/sodium formaldehyde sulphoxylate, cumene hydroperoxide/sodium metabisulphite, potassium persulphate/sodium bisulphite, cumene hydroperoxide/iron (II) sulphate and the like. Polymerisation initiators are usually added in amounts between about 0.1 and 6% by weight of the monomers polymerised, preferably between 0.5 and 5%.

A preferred process for preparing the coating composition comprises (a) contacting a mixture of polymer (i) and polymer (ii) in organic solvent with a base so as to at least partially neutralise the carboxyl groups on the polymer and (b) forming a dispersion of the at least partially neutralised polymer in an aqueous medium. This creates what Is commonly known as a secondary dispersion. This type of dispersion is preferred over a primary dispersion. A primary dispersion results from a polymerisation process that leads directly to a polymer dispersed in water, for example emulsion polymerisation.

Any crosslinker and any other components can be dispersed into the aqueous dispersion of addition polymer. Generally, when the crosslinker is an unblocked polyisocyanate then the composition is preferably made by adding the polyisocyanate, optionally as a solution in an organic solvent, to the aqueous dispersion shortly before use. This minimises the problems with the potlife of the compositions. In a particularly preferred embodiment the crosslinker and other components can also be mixed with the polymer in organic solvent before the polymer is dispersed in water.

The coating composition of the invention can be applied as a layer to the surface of a substrate and then allowed or caused to dry and cure. According to the present invention there is provided a process for coating a substrate that comprises the steps of applying a layer of a coating composition according to the present invention to a surface of the substrate and thereafter causing or allowing the layer to cure.

The compositions are particularly useful as vehicle refinish primers or topcoats. Primers are somewhat heavily pigmented compositions that are applied over the bare substrate or over the pre-existing coating before the new topcoat is applied. Topcoats are the final coating applied to give the vehicle its colour and gloss as well as providing protection from, the elements and physical damage.

The coating composition can be applied by conventional means such as brushing, rollercoating or spraying, preferably by spraying.

The applied layer can be allowed to cure at ambient temperature in the case where the polymer and crosslinker react together at ambient temperatures. This is generally the case for example when the polymer has hydroxyl groups and the crosslinker is a polyisocyanate.

Alternatively the layer can be baked at elevated temperatures, for example 50-130° C., either to accelerate curing or to cause curing when the crosslinker will only react with the polymer at elevated temperatures. This is generally the case when the polymer has hydroxyl groups and the crosslinker is a blocked polyisocyanate or a melamine formaldehyde.

According to the present invention there is also provided a coated article obtainable by the process.

The invention will now be illustrated by means of the following examples.

In the examples the following abbreviations are used:

| | |
|---|---|
| AA | acrylic acid |
| AMS | alpha-methylstyrene |
| AV | acid value (mg KOH/g NV) |
| BA | butyl acrylate |

Cythane 3174 adduct of 1,3-bis isocyanate 1-methylethyl) benzene (TMXDI) and 2-ethyl-2-(hydroxymethyl)-1,3-propanediol (trimethyl propane) available from Cytec.

| | |
|---|---|
| DMAE | N,N-dimethylethanolamine |
| HBA | 4-hydroxybutyl acrylate |
| HTD LV | isocyanurate trimer of 1,6-diisocyanatohexane available from Rhodia as Tolonate HDTLV | as Tolonate HDT LV

| | |
|---|---|
| MiAK | methyl isoamyl ketone |
| MMa | methyl methacrylate |
| MPA | 3-mercaptopropionic acid |
| POM | 1-octanethiol |
| tBA | t-butyl acrylate |
| Vazo 67 | polymerisation initiator available from DuPont |
| St | styrene |
| NV | non-volatiles |
| Byk 346 | a polyether modified polymethylsiloxane available from Byk Chemie |
| HEMa | hydroxyethyl methacrylate |
| IBoMa | isobornyl methacrylate |
| Lma | lauryl methacrylate |

EXAMPLES

1. Synthesis of Acrylic Copolymers 1 to 17

Acrylic copolymers 1 to 17 as set out in table 1 were synthesised using the following procedure.

The charge was heated to reflux (approximately 140° C.) in a reaction vessel fitted with stirrer, heating mantle, water condenser and nitrogen blanket. The charge was held at reflux and stirred whilst the teed mixture was fed into the reaction vessel at a uniform rate over 180 minutes. The mixture was stirred for a further 15 minutes. Initiator shot 1 was added over 10 minutes, the mixture stirred for one hour. Initiator shot 2 was added over 10 minutes, the mixture was stirred for a further one hour and then allowed to cool.

TABLE 1

Acrylic Copolymers - formulations

| | Charge (g) | | | | Feed Monomers (g) | | | | | | | Initiator (g) | chain Transfer Agent (g) | | Initiator Spikes (T21S) (g) | |
|---|---|---|---|---|---|---|---|---|---|---|---|---|---|---|---|---|
| Copolymer | MIAK | St | Lma | iBoMa | AMS | BA | tBA | HBA | AA | Mma | HEMa | Vazo 67 | POM | MPA | 1 | 2 |
| 1 | 861.4 | | | | 365.9 | 359.1 | 608.2 | 585.1 | 51.4 | 36.1 | | 70.2 | 17.3 | 38.3 | 3.5 | 3.5 |
| 2 | 864.8 | | | | 235.5 | 347.6 | 608.8 | 577.6 | 38.8 | 200.9 | | 70.3 | 17.3 | 38.4 | 3.5 | 3.5 |
| 3 | 861.4 | | | | 345.2 | 355.2 | 609.4 | 514.5 | 57.8 | 54 | | 70.2 | 17.3 | 38.3 | 3.5 | 3.5 |
| 4 | 861.4 | | | | | 293.1 | 607.8 | 577.3 | 38.3 | 489 | | 70.2 | 17.3 | 38.3 | 3.5 | 3.5 |
| 5 | 861.4 | | | | | 293.5 | 607.8 | 577.7 | 167.3 | 359.5 | | 70.2 | 17.3 | 38.3 | 3.5 | 3.5 |
| 6 | 861.4 | | | | 322.7 | 349.2 | 605.1 | 579.9 | 43.8 | 71.6 | | 70.2 | 17.3 | 38.3 | 3.5 | 3.5 |
| 7 | 861.4 | | | | | 291.8 | 605.1 | 575.1 | 44.6 | 480.4 | | 70.2 | 17.3 | 38.3 | 3.5 | 3.5 |
| 8 | 856.8 | | | | 339.5 | 359.5 | 605.1 | 575.1 | 43.9 | 73.9 | | 69.9 | 17.3 | 38.3 | 3.5 | 3.5 |
| 9 | 861.7 | | | | 426.7 | 375.3 | 603.9 | 575.7 | 12.75 | | | 69.7 | 69.5 | | 3.5 | 3.5 |
| 10 | 861.4 | | | | 406.4 | 366.1 | 609.5 | 585.4 | 38.4 | | | 70.2 | 17.3 | 38.3 | 3.5 | 3.5 |
| 11 | 861.4 | | | | 429.7 | 377.9 | 607.8 | 577.7 | 12.6 | | | 70.2 | 17.3 | 38.3 | 3.5 | 3.5 |
| 12 | 861.4 | | | | | 293.7 | 607.8 | 577.7 | 216.8 | 307.9 | | 70.2 | 17.3 | 38.3 | 3.5 | 3.5 |
| 13 | 861.4 | | | | | 454.3 | | 577.7 | 167.3 | 806.5 | | 70.2 | 17.3 | 38.3 | 3.5 | 3.5 |
| 14 | 861.4 | 98.6 | 682.1 | 225.5 | 398.4 | | | 573.7 | 12.8 | | | 69.7 | 69.5 | | 3.5 | 3.5 |
| 15 | 861.4 | 100.3 | 682 | 204 | 401.2 | | 577.7 | | 38.7 | | | 70.2 | 17.3 | 38.3 | 3.5 | 3.5 |
| 16 | 861.4 | | | | 406.4 | 388.1 | 609.6 | | 38.5 | | 585.3 | 70.2 | 17.3 | 38.3 | 3.5 | 3.5 |
| 17 | 861.4 | | | | | 293.5 | 607.8 | | 167.3 | 359.5 | 577.7 | 70.2 | 17.3 | 38.3 | 3.5 | 3.5 |

The composition and molecular weights of copolymers 1 to 17 are shown in Table 2.

TABLE 2

Acrylic Copolymers - Compositions and molecular Weight

| Copolymer | Monomer Composition (% by weight) | | | | | | | | | | AV | molecular weight | |
|---|---|---|---|---|---|---|---|---|---|---|---|---|---|
| | St | LMa | iBoMa | AMS | BA | tBA | HBA | AA | Mma | HEMa | | Mn | Mw |
| 1 | 0.0 | 0.0 | 0.0 | 18.2 | 17.9 | 30.3 | 29.2 | 2.6 | 1.8 | 0.0 | 30 | 2500 | 6500 |
| 2 | 0.0 | 0.0 | 0.0 | 11.7 | 17.3 | 30.3 | 28.7 | 1.9 | 10.0 | 0.0 | 25 | 2400 | 6400 |
| 3 | 0.0 | 0.0 | 0.0 | 17.2 | 17.7 | 30.4 | 29.1 | 2.9 | 2.7 | 0.0 | 32.5 | 2600 | 7200 |
| 4 | 0.0 | 0.0 | 0.0 | 0.0 | 14.6 | 30.3 | 28.8 | 1.9 | 24.4 | 0.0 | 25 | 2000 | 5600 |
| 5 | 0.0 | 0.0 | 0.0 | 0.0 | 14.6 | 30.3 | 28.8 | 8.3 | 17.9 | 0.0 | 75 | 2900 | 15100 |
| 6 | 0.0 | 0.0 | 0.0 | 16.2 | 17.5 | 30.4 | 29.1 | 3.2 | 3.6 | 0.0 | 35 | 2400 | 7200 |
| 7 | 0.0 | 0.0 | 0.0 | 0.0 | 14.6 | 30.3 | 28.8 | 2.2 | 24.1 | 0.0 | 27.5 | 2300 | 5800 |
| 8 | 0.0 | 0.0 | 0.0 | 17.0 | 18.0 | 30.3 | 28.8 | 2.2 | 3.7 | 0.0 | 27.5 | 2200 | 5600 |
| 9 | 0.0 | 0.0 | 0.0 | 21.4 | 18.8 | 30.3 | 28.8 | 0.6 | 0.0 | 0.0 | 5 | 1700 | 4100 |
| 10 | 0.0 | 0.0 | 0.0 | 20.3 | 18.3 | 30.4 | 29.2 | 1.9 | 0.0 | 0.0 | 25 | 2100 | 5700 |
| 11 | 0.0 | 0.0 | 0.0 | 21.4 | 18.8 | 30.3 | 28.8 | 0.6 | 0.0 | 0.0 | 15 | 2500 | 5500 |
| 12 | 0.0 | 0.0 | 0.0 | 0.0 | 14.6 | 30.3 | 28.8 | 10.9 | 15.3 | 0.0 | 95 | 2700 | 32800 |
| 13 | 0.0 | 0.0 | 0.0 | 0.0 | 22.6 | 0.0 | 28.8 | 8.3 | 40.2 | 0.0 | 75 | 3000 | 16500 |
| 14 | 5.0 | 34.2 | 11.3 | 20.0 | 0.0 | 0.0 | 28.8 | 0.6 | 0.0 | 0.0 | 5 | 1800 | 4100 |
| 15 | 5.0 | 34.0 | 10.3 | 20.0 | 0.0 | 0.0 | 28.8 | 1.9 | 0.0 | 0.0 | 25 | 2300 | 6100 |
| 16 | 0.0 | 0.0 | 0.0 | 20.3 | 18.3 | 30.4 | 0.0 | 1.9 | 0.0 | 29.2 | 25 | 1800 | 4300 |
| 17 | 0.0 | 0.0 | 0.0 | 0.0 | 14.6 | 30.3 | 0.0 | 8.3 | 17.9 | 28.8 | 75 | 1900 | 5200 |

Example I to XIV

Formulations of polymer only systems (i.e. without a cross-linker) that have been studied are given in table 3. The polymer numbers are the polymers shown in table 1. The polymer systems were evaluated using the following procedure.

The polymers and DMAE were mixed thoroughly. Demineralised water was then added slowly to the mixture whilst it was stirred with a spatula. The mass of water required to reduce the viscosity of the system to between 25 and 30 seconds in a DIN 4 flow cup was recorded.

The results are shown in tabular form in Table 4, and in graph form in FIG. 1 of the accompanying drawings.

These compositions could all be converted to thermosetting coating compositions by the addition of a suitable crosslinker, for example a polyisocyanate.

TABLE 3

Polymer only systems - formulations.

| Example | First Polymer (i) | Mass (g) | Second Polymer (ii) | Mass (g) | DMAE (g) | Overall styrene and substituted styrene content of polymers (i) and (ii) (%) |
|---|---|---|---|---|---|---|
| I | 2 | 50 | | | 1.04 | 11.7 |
| II | 12 | 10 | 9 | 40 | 0.96 | 17.1 |
| III | 8 | 50 | | | 1.15 | 17.0 |
| IV | 12 | 12.5 | 9 | 37.5 | 1.15 | 16.1 |
| V | 5 | 2.5 | 10 | 47.5 | 1.15 | 19.3 |
| VI | 1 | 50 | | | 1.25 | 18.2 |
| VII | 12 | 10 | 11 | 40 | 1.25 | 17.1 |
| VIII | 5 | 5 | 10 | 45 | 1.25 | 18.3 |
| IX | 3 | 50 | | | 1.36 | 17.2 |
| X | 12 | 15 | 9 | 35 | 1.36 | 15.0 |
| XI | 5 | 7.5 | 10 | 42.5 | 1.36 | 17.3 |
| XII | 6 | 50 | | | 1.46 | 16.2 |
| XIII | 12 | 12.5 | 11 | 37.5 | 1.46 | 16.1 |
| XIV | 5 | 10 | 10 | 40 | 1.46 | 16.2 |

TABLE 4 polymer only systems - results

| Example | First Polymer AV | Second Polymer AV | Average AV (weight average) | Water Required (g) | Viscosity (seconds) | Solids Content (% by weight) |
|---|---|---|---|---|---|---|
| I | 25 | | 25 | 191.7 | 28 | 23.8 |
| II | 95 | 5 | 23 | 99 | 26 | 35 |
| III | 27.5 | | 27.5 | 194.6 | 25 | 23.6 |
| IV | 95 | 5 | 27.5 | 80.5 | 30 | 38.4 |

TABLE 4-continued polymer only systems - results

| Example | First Polymer AV | Second Polymer AV | Average AV (weight average) | Water Required (g) | Viscosity (seconds) | Solids Content (% by weight) |
|---|---|---|---|---|---|---|
| V | 75 | 25 | 27.5 | 172.6 | 27 | 25.5 |
| VI | 30 |  | 30 | 220.1 | 26 | 21.7 |
| VII | 95 | 15 | 31 | 182.5 | 28 | 24.6 |
| VIII | 75 | 25 | 30 | 156.8 | 25 | 27 |
| IX | 32.5 |  | 32.5 | 225.6 | 26 | 21.3 |
| X | 95 | 5 | 32 | 90.4 | 25 | 35.8 |
| XI | 75 | 25 | 32.5 | 142.8 | 30 | 28.5 |
| XII | 35 |  | 35 | 234.2 | 28 | 20.8 |
| XIII | 95 | 15 | 35 | 132.8 | 30 | 29.7 |
| XIV | 75 | 25 | 35 | 154.8 | 30 | 27.2 |

Table 4 demonstrates that the blends consistently give higher solids than a single resin of the same average monomer composition and AV. This benefit is illustrated graphically in FIG. 1 of the accompanying drawings.

Examples XV to XXV

The formulations are given in Table 5. Formulations of polymers with cross-linker systems were prepared and tested as follows:

The polymers and DMAE were mixed thoroughly in the proportions shown in Table 5. The polymer numbers correspond to the polymers of Table 1. The isocyanate was then added with stirring until homogeneous. Demineralised water was then added slowly to me mixture whilst it was stirred with a spatula. The mass of water required to reduce the viscosity of the system to between 25 and 30 seconds in a DIN 4 flow cup was recorded.

TABLE 5 polymer and crosslinker systems - formulations

| Examples | First Polymer (i) | Mass (g) | Second Polymer (ii) | Mass (g) | DMAE | ISO (g) | Overall styrene and substituted styrene content of polymers (i) and (ii) (%) |
|---|---|---|---|---|---|---|---|
| XV | 2 | 50 |  |  | 1.04 | 26.7 | 11.7 |
| XVI | 12 | 10 | 9 | 40 | 0.96 | 26.7 | 17.1 |
| XVII | 8 | 50 |  |  | 1.15 | 26.7 | 17.0 |
| XVIII | 12 | 12.5 | 9 | 37.5 | 1.15 | 26.7 | 16.1 |
| XIX | 1 | 50 |  |  | 1.25 | 26.7 | 18.2 |
| XX | 5 | 5 | 10 | 45 | 1.25 | 26.7 | 18.3 |
| XXI | 3 | 50 |  |  | 1.36 | 26.7 | 17.2 |
| XXII | 12 | 15 | 9 | 35 | 1.36 | 26.7 | 15.0 |
| XXIII | 5 | 7.5 | 10 | 42.5 | 1.36 | 26.7 | 17.3 |
| XXIV | 6 | 50 |  |  | 1.46 | 26.7 | 16.2 |
| XXV | 5 | 10 | 10 | 40 | 1.46 | 26.7 | 16.2 |

ISO is a mixture of 80% Cythane 3174 and 20% HTD LV

Figure 2:
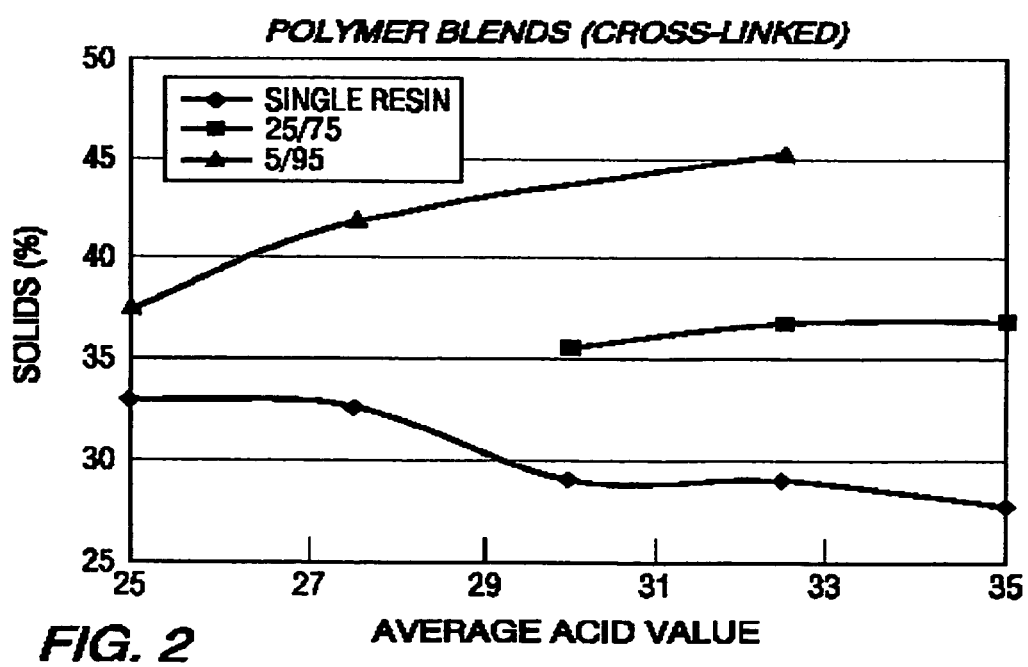
FIG. 2 is a graph comparing average acid value to percent solids content for the compositions prepared in Examples XV to XXV.

The results are shown in tabular form in Table 6, and in graph form in FIG. 2 of the accompanying drawings.

TABLE 6 polymer and crosslinker systems - results

| Examples | First Polymer AV | Second Polymer AV | Average AV (weighted average) | Water required (g) | DIN4 viscosity (seconds) | Solids content (% by weight) |
|---|---|---|---|---|---|---|
| XV | 25 |  | 25 | 90.9 | 26 | 32.9 |
| XVI | 95 | 5 | 23 | 66 | 30 | 37.4 |
| XVII | 27.5 |  | 27.5 | 92.8 | 25 | 32.5 |
| XVIII | 95 | 5 | 27.5 | 55.3 | 27 | 41.7 |
| XIX | 30 |  | 30 | 113.7 | 29 | 28.9 |
| XX | 75 | 25 | 30 | 78.4 | 24 | 35.5 |
| XXI | 32.5 |  | 32.5 | 114.1 | 26 | 28.9 |
| XXII | 95 | 5 | 32 | 44.3 | 25 | 45.3 |
| XXIII | 75 | 25 | 32.5 | 72.8 | 26 | 36.7 |
| XXIV | 35 |  | 35 | 122.8 | 27 | 27.6 |
| XXV | 75 | 25 | 35 | 72.4 | 28 | 36.8 |

Table 6 demonstrates that the blends consistently give higher solids than a single resin of the same average monomer composition and AV.

Examples XXVI to XXXI

The formulations are given in table 7. Formulations of polymers with crosslinker systems were prepared and tested as follows:—

The polymers and DMAE were mixed thoroughly in the proportions shown in table 7. The polymer numbers correspond to the polymers of table 1. The isocyanate was then added with stirring until homogeneous. Demineralised water was then added slowly to the mixture whilst it was stirred with a spatula. The mass of water to reduce the viscosity of the system to between 25 and 30 seconds in a DIN 4 cup was recorded.

TABLE 7 polymer and crosslinker systems - formulations

| Examples | First Polymer (i) | Mass (g) | Second polymer (ii) | Mass (g) | DMAE (g) | ISO (g) | Overall styrene and substituted content of polymers (i) and (ii) (%) |
|---|---|---|---|---|---|---|---|
| XXVI | 13 | 5 | 14 | 95 | 0.7 | 53.4 | 23.8 |
| XXVII | 13 | 10 | 14 | 90 | 1.0 | 53.4 | 22.5 |
| XXVIII | 13 | 20 | 14 | 80 | 1.6 | 53.4 | 20.0 |
| XXIX | 13 | 25 | 14 | 75 | 1.9 | 53.4 | 18.8 |
| 88XXX | 13 | 30 | 14 | 70 | 2.2 | 53.4 | 17.5 |
| XXXI | 13 | 40 | 14 | 60 | 2.8 | 53.4 | 15.0 |

ISO is a mixture of 80% by weight Cythane 3174 and 20% by weight HDT LV

The results are shown in table 8

TABLE 8 polymer and crosslinker systems - results

| Examples | First Polymer AV | Second Polymer AV | Average AV (weighted average) | Water required (g) | DIN4 viscosity (seconds) | Solids content (% by weight) |
|---|---|---|---|---|---|---|
| XXVI | 75 | 5 | 8.5 | 128.9 | 28 | 39.2 |
| XXVII | 75 | 5 | 12 | 100.1 | 26 | 43.6 |
| XXVIII | 75 | 5 | 19 | 106.2 | 27 | 42.5 |
| XXIX | 75 | 5 | 22.5 | 101.7 | 25 | 43.2 |
| XXX | 75 | 5 | 26 | 114.0 | 25 | 41.1 |
| XXXI | 75 | 5 | 33 | 105.4 | 25 | 42.4 |

Example XXXII 80 g of polymer 16, 20 g of polymer 17 and 2.92 g of DMAE were mixed until homogeneous. 130 g of demineralised water were then added slowly whilst the mixture was stirred with a spatula. 35.4 g of Bayhydur 3100 (hydrophilically modified trimer of 1,6-diisocyanatohexane available from Bayer) were then added with stirring following by enough demineralised water to reduce the vicosity of the mixture to between 25 and 30 seconds in a DIN 4 flow cup. 25.7 g were required giving a solids content of 35.6%. The overall styrene and substituted styrene content of polymers (i) and (ii) was 16.2%.

Preparation of a Polyester Polyol 23.3 parts by weight of trimethylol propane, 9.5 parts by weight of neopentyl glycol and 37.0 parts of hexahydrophthalic anhydride were heated with stirring under a nitrogen atmosphere until the mixture began to exotherm (at about 90° C.) when heated was stopped. The temperature of the mixture rose to about 140° C. due to the exotherm. When the exotherm was over and temperature began to fall, heating was resumed and the temperature was raised to 205° C. As the temperature was raised, water was removed via a fractionating column. When the mixture was at 205° C. and the evolution of water had slowed, the mixture was allowed to cool.

The fractionating column was replaced with a Dean & Stark column filled with methyl isobutyl ketone. Methyl isobutyl ketone (3.2 parts) was added to the mixture and the temperature was raised to reflux to remove further water. When the acid value of the mixture reached 30-35 mg KOH/g non-vol. the heat was removed. The mixture was allowed to cool to 120° C. Methyl amyl ketone (27.0 parts) was then added and the mixture was stirred until a homogenous solution had formed.

Examples XXXIII to XXXVIII

Six cold rolled steel test panels were sanded with P180 sandpaper and solvent wiped with white spirit. The panels were then coated with 20-25 microns of chromate free etch primer P565-713 (available from ICI Autocolor, used as instructed on the product data sheet), followed by 100 microns of Hidur Rapide undercoat P565-693 (available from ICI Autocolour, used as instructed on the product data sheet). 100 parts by weight of Aquabase medium coarse aluminium basic P968-9987 was mixed with 10.3 parts by weight of Aquabase activator P935-2018 and 3 parts by weight of Aquabase thinner P275-366 (all available from ICI Autocolor). This was spray applied to the panels to give a film build up of 12-15 microns. The panels were then coated with the clearcoat compositions given in table 9 below.

TABLE 9 clearcoat compositions

| Example | First Polymer (i) | Mass (g) | Second Polymer (ii) | Mass (g) | Polyester (g) | Byk 346 (g) | DMAE (g) | RM8~ (g) | DBIDL (g)* | ISO (g) | Overall styrene and substituted styrene content of polymers (i) and (ii) (%) |
|---|---|---|---|---|---|---|---|---|---|---|---|
| XXXIII | 13 | 15 | 15 | 85 |  | 0.7 | 2.71 | 2.85 | 0.28 | 53.4 | 21.3 |
| XXXIV | 13 | 12 | 15 | 68 | 20 | 0.7 | 2.75 | 2.85 | 0.28 | 54.1 | 21.3 |
| XXXV | 13 | 15 | 15 | 85 |  | 0.7 | 2.71 | 2.85 | 0.28 | 60.3 | 21.3 |
| XXXVI | 12 | 5 | 9 | 75 | 20 | 0.7 | 2.71 | 2.85 | 0.54 | 64.1 | 20.1 |
| XXXVII | 3 | 100 |  |  |  | 0.7 | 2.71 | 2.85 | 0.28 | 53.4 | 17.2 |

*A solution of 2% by weight DBTDL in butyl acetate
** A mixture of 80% by weight Cythane 3174 and 20% by weight HDT LV
*** Cythane 3174
~11% by weight Acrysol TM-8W (a theology modifier available from Rohm and Haas) in demineralised water.

Compositions XXXIII to XXXVII were prepared by first mixing all of the ingredients except the polyisocyanate until homogenous. The polyisocyanate was added with stirring to give a homogeneous mixture. Demineralised water was then added slowly to the mixture whilst it was stirred with a spatula. The mass of water required to reduce the viscosity of system to between 25 and 30 seconds in a DIN 4 flow cup was recorded. All compositions were prepared immediately prior to spraying. Composition XXXIII required 158.4 g of water giving a solids content of 35.1%, composition XXXIV required 124.4 g of water giving a solids content of 40.6%, composition XXXV required 179.9 g of water giving a solids content of 33.3%, composition XXXVI required 172.3 g of water giving a solids content of 35.0% and composition XXXVII required 256.2 g of water giving a solids content of 26.8%. Composition XXVIII had a solids content of 50.3%. P190-643 was prepared as instructed on the product data sheet. The clearcoats were spray applied to give a film build of about 60 microns. All of the compositions required two coats to achieve the required film build except for example XXXVII that required three coats. After application the coated panels were left at room temperature for thirty minutes before being low-baked at 60° C. for thirty minutes. The 20° gloss of each coating was measured using a Erichsen (trademark) glossmeter and the hardness was measured using a Leitz (trademark) Knoop Hardness Tester. The results are shown in table 10. The solvent content of each composition, expressed as the mass of organic solvent present per 100 g of non-volatile material, is also shown in this table.

TABLE 10 glass and hardness results

| Example | Gloss | | Hardness (/knoops) | | Solvent |
| --- | --- | --- | --- | --- | --- |
| | 1 day after application | 1 week after application | 1 day after application | 1 week after application | content per 100 g NV (g) |
| XXXIII | 88.2 | 89.6 | 2.3 | 4.3 | 35.7 |
| XXXIV | 88.2 | 87.2 | 1.1 | 5.8 | 35.0 |
| XXXV | 88.0 | 90.5 | 2.3 | 6.3 | 38.8 |
| XXXVI | 80.7 | 77.8 | 2.2 | 5.5 | 35.5 |
| XXXVII | 84.8 | 87.7 | 3.0 | 3.9 | 35.7 |
| XXXVIII | 82.1 | 81.4 | 2.2 | 7.9 | 98.8 |

The invention claimed is:

1. An aqueous thermosetting coating composition comprising a dispersion in an aqueous medium of a mixture of
 (i) an acrylic addition polymer having an acid value of at least 75 mg KOH/g,
 (ii) an acrylic addition polymer having an acid value lower than that of polymer (i) and
 (iii) a base
 wherein polymer (i) and/or polymer (ii) contain additional functional groups, wherein (i) has a lower hydrophobic monomer content than polymer (ii) and an overall styrene and substituted styrene content of polymers (i) and (ii) is 30% by weight or less, based on polymer weight and
 wherein polymer (ii) has a hydrophobic monomer content of at least 10% by weight based on polymer weight.

2. A composition as claimed in claim 1, in which the overall styrene and substituted styrene content of polymer (i) and (ii) is from 15.0% to 23.8%.

3. A composition as claimed in claim 1 in which the overall styrene and substituted styrene content of polymers (i) and (ii) is from 15.0% to 22.5%.

4. A composition as claimed in claim 1, in which the overall styrene and substituted styrene content of polymers (i) and (ii) is from 16.1% to 21.3%.

5. A coating composition as claimed in claim 1, in which polymer (i) has a hydrophobic monomer content of 10% by weight or less.

6. An aqueous thermosetting coating composition comprising a dispersion in an aqueous medium of a mixture of
 (i) an acrylic addition polymer having an acid value of at least 75 mg KOH/g,
 (ii) an acrylic addition polymer having an acid value lower than that of polymer (i) and
 (iii) a base,
 wherein polymer (i) and/or polymer (ii) contain additional functional groups, wherein (i) has a lower hydrophobic monomer content than polymer (ii), polymer (i) has a hydrophobic monomer content of 10% by weight or less based on polymer weight, and polymer (ii) has a hydrophobic monomer content of at least 10% by weight based on polymer weight.

7. A coating composition as claimed in claim 6, in which polymer (i) has a hydrophobic monomer content of 5% by weight or less.

8. A coating composition as claimed in claim 6, in which polymer (ii) has a hydrophobic monomer content of at least 20% by weight.

9. A composition as claimed in claim 6, in which polymer (i) has an acid value of 75 to 150 mg KOH/g.

10. A composition as claimed in claim 6, in which polymer (i) has an acid value of 75 to 120 mg KOH/g.

11. A composition as claimed in claim 6, in which polymer (i) has an acid value of 75 to 100mg KOH/g.

12. A composition as claimed in claim 6, in which polymer (i) has an acid value of 95 mg KOH/g.

13. A composition as claimed in claim 6, in which polymer (ii) has an acid value of less than 20 mg KOH/g.

14. A composition as claimed in claim 6, in which polymer (ii) has an acid value of less than 10 mg KOH/g.

15. A composition as claimed in claim 6, in which polymer (ii) has an acid value of 5 mg KOH/g or less.

16. A coating composition as claimed in claim 6, in which polymer (i) and polymer (ii) are present at a ratio of 1:99 to 99:1.

17. A coating composition as claimed in claim 16 in which polymer (i) and polymer (ii) are present at a ratio of 1:99 to 1:1.

18. A coating composition as claimed in claim 17 in which polymer (i) polymer (ii) are present at a ratio of 1:19 to 3:7.

19. A coating composition as claimed in claim 16, in which polymer (i) and/or polymer (ii) contain additional functional groups selected from hydroxyl groups, aceto acetate groups, alkoxy silane groups or epoxy groups.

20. A coating composition as claimed in claim 19 also comprising a crosslinker.

21. A coating composition as claimed in claim 19 in which the additional functional groups are hydroxyl groups.

22. A coating composition as claimed in claim 20 in which the additional functional groups are hydroxyl groups and the crosslinker is a polyisocyanate or a melamine resin.

23. A coating composition as claimed in claim 19 in which the crosslinker is a polyisocyanate.

24. An article coated with a composition as claimed in claim 1.

25. An article coated with a composition as claimed in claim 20, in which said composition has been cured.

26. A process for forming a coated article which comprises coating said article with a composition as claimed in claim 20 and curing said composition.

27. A coated article obtained by a process as claimed in claim 26.

28. The aqueous thermosetting coating composition of claim 1, wherein polymer (ii) comprises an acid.

29. The aqueous thermosetting coating composition of claim 1, wherein polymer (i) and polymer (ii) can be produced separately and then mixed such that the mixture has a solids content of at least about 35% at a DIN 4 viscosity of between about 25 and 30 seconds.

30. The aqueous thermosetting coating composition of claim 1, wherein polymer (i) and polymer (ii) are produced separately and then mixed such that the mixture has a solids content of at least about 35% at a DIN 4 viscosity of between about 25 and 30 seconds.

31. The aqueous thermosetting coating composition of claim 6, wherein polymer (ii) comprises an acid.

32. The aqueous thermosetting coating composition of claim 6, wherein polymer (i) and polymer (ii) can be produced separately and then mixed such that the mixture has a solids content of at least about 35% at a DIN 4 viscosity of between about 25 and 30 seconds.

33. The aqueous thermosetting coating composition of claim 6, wherein polymer (i) and polymer (ii) are produced separately and then mixed such that the mixture has a solids content of at least about 35% at a DIN 4 viscosity of between about 25 and 30 seconds.

34. A process for preparing an aqueous coating composition comprising dispersing in an aqueous medium a mixture of (i) an acrylic addition polymer having an acid value of at least 20 mg KOH/g, (ii) an acrylic addition polymer having an acid value lower than that of polymer (i), and (iii) a base, wherein polymer (i) and/or polymer (ii) contain additional functional groups, and wherein polymer (i) has a lower hydrophobic monomer content than polymer (ii) and an overall styrene and substituted styrene content of polymer (i) and (ii) is 30% by weight or less based on polymer weight, wherein the process further comprises
   (a) contacting a mixture of polymer (i) and polymer (ii) in organic solvent with a base so as to at least partially neutralize the carboxyl groups on the polymer, and
   (b) forming a dispersion of the at least partially neutralized mixture of polymers in an aqueous medium.

35. An aqueous coating composition prepared by the process of claim 34.

36. The process of claim 34, wherein polymer (ii) has a hydrophobic monomer content of at least 10% by weight based on polymer weight.

37. The process of claim 34, wherein the overall styrene and substituted styrene content of polymer (i) and (ii) is from 15.0% to 23.8%.

38. The process of claim 34, wherein polymer (i) has a hydrophobic monomer content of 10% by weight or less based on polymer weight.

39. The process of claim 38, wherein polymer (i) has a hydrophobic monomer content of 5% by weight or less.

40. The process of claim 36, wherein polymer (ii) has a hydrophobic monomer content of at least 20% by weight.

41. The process of claim 34, wherein polymer (i) has an acid value of 35 to 150 mg KOH/g.

42. The process of claim 41, wherein polymer (i) has an acid value of 50 to 120 mg KOH/g.

43. The process of claim 42, wherein polymer (i) has an acid value of 15 to 100 mg KOH/g.

44. The process of claim 34, wherein polymer (ii) has an acid value of less than 10 mg KOH/g.

45. The process of claim 44, wherein the polymer (ii) has an acid value of less than 5 mg KOH/g.

46. The process of claim 34, wherein polymer (i) and polymer (ii) are present at a ratio of 1:99 to 1:1.

47. The process of claim 46, wherein polymer (i) polymer (ii) are present at a ratio of 1:19 to 3:7.

48. The process of claim 34, wherein the coating composition comprises a crosslinker.

49. An article coated with a coating composition produced by the process of claim 34.

* * * * *

UNITED STATES PATENT AND TRADEMARK OFFICE
CERTIFICATE OF CORRECTION

PATENT NO. : 7,368,499 B2
APPLICATION NO. : 10/945040
DATED : May 6, 2008
INVENTOR(S) : David Robert Fenn et al.

It is certified that error appears in the above-identified patent and that said Letters Patent is hereby corrected as shown below:

Column 18, Line 35 (Claim 43)
 "15" should be --75--

Signed and Sealed this

Twenty-sixth Day of August, 2008

JON W. DUDAS
*Director of the United States Patent and Trademark Office*